Oct. 3, 1967 N. A. GERVAIS 3,344,951
EJECTION PILL DISPENSER WITH INDICATING MEANS
Filed April 18, 1966 3 Sheets-Sheet 1

INVENTOR.
NORMAN A. GERVAIS
BY
ATTORNEY

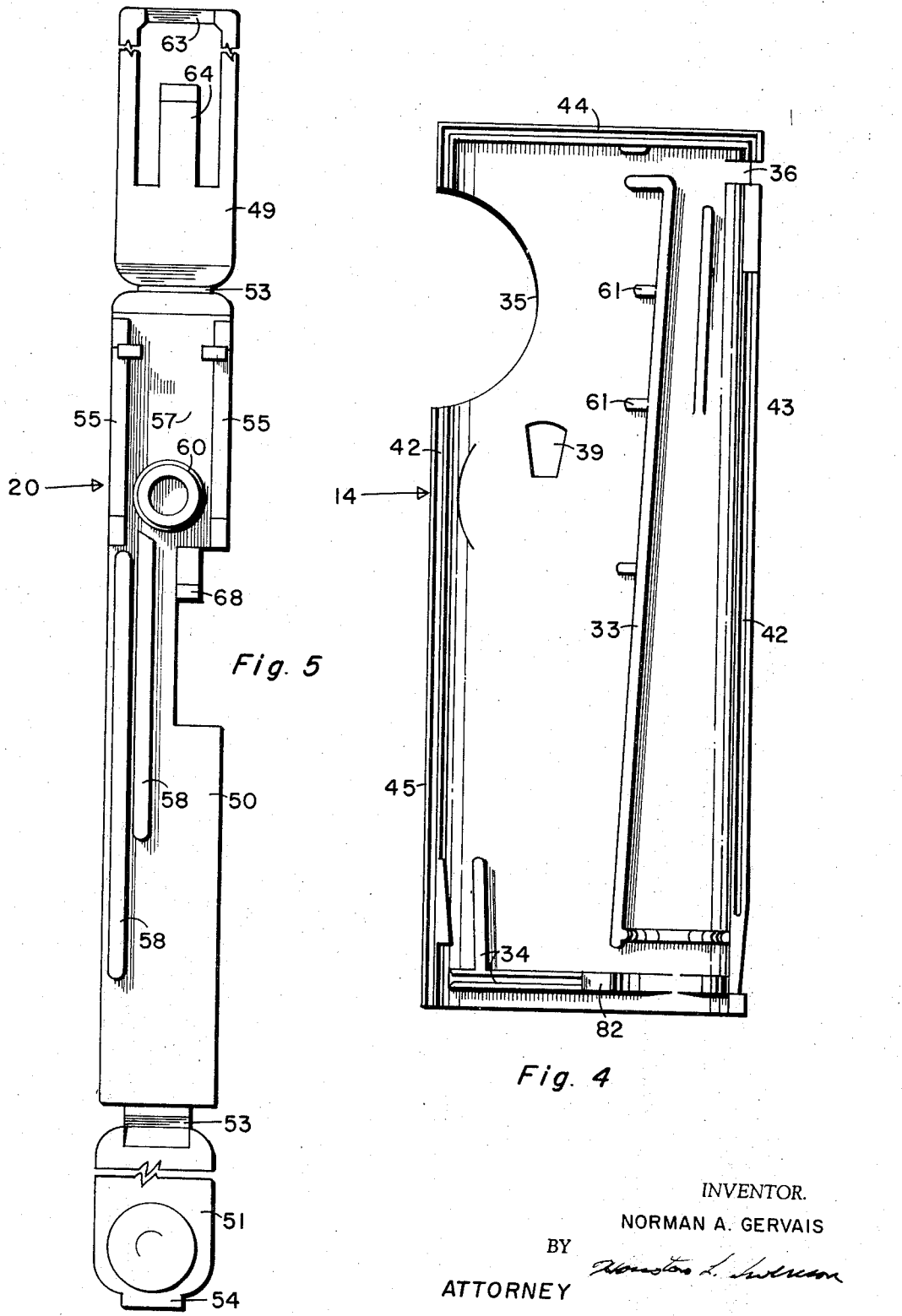

Oct. 3, 1967   N. A. GERVAIS   3,344,951
EJECTION PILL DISPENSER WITH INDICATING MEANS
Filed April 18, 1966   3 Sheets-Sheet 3

INVENTOR.
NORMAN A. GERVAIS
BY
ATTORNEY

United States Patent Office 3,344,951
Patented Oct. 3, 1967

3,344,951
EJECTION PILL DISPENSER WITH INDICATING MEANS
Norman A. Gervais, Salem, Va., assignor to
Creative Packaging Incorporated
Filed Apr. 18, 1966, Ser. No. 543,392
7 Claims. (Cl. 221—7)

ABSTRACT OF THE DISCLOSURE

A refillable dispenser for pills loaded in a stacked, predetermined sequence. An ejector means is positioned in the casing of the dispenser to simultaneously eject the topmost pill and advance a rotary dial bearing a series of indicia.

---

This invention relates to a pill dispenser and in particular to a pill dispenser having means for automatically indicating the removal of each pill from the dispenser.

In writing out prescriptions it is generally the practice of physicians to state that a pill should be taken at prescribed intervals. The intervals may be only a matter of hours, or, on the other hand, may be on the basis of one per day, or perhaps one every other day. In any event, it is essential that the user be able to determine whether or not he has taken a pill for that interval since it is quite possible that his memory will fail him. Various devices have been contrived in which the user, upon taking a pill from the dispenser or container, will, in a separate physical action, record this fact. For those persons who are always able to remember to make a recording mark or other similar act, such a procedure is sufficient. However, many a person has tended to forget entering on his own personal record the fact that he has taken a pill for a specified day. Thus, he is confronted with the problem of trying to remember whether or not he actually took a pill for that interval.

The pill dispenser of this invention provides for an automatic recording or registering of the fact that the user has taken a pill for the prescribed interval. Briefly, the pill dispenser and indicator of this invention comprise a relatively small pocket-size dispenser containing a predetermined number of pills to be used over a prescribed period of time. For instance, the dispenser may contain twenty pills with a pill to be taken each successive day. In addition, the pills may be arranged in a predetermined sequence of several types of medicament. The dispenser will assure that one form of medicament is taken before a second form of medicament is taken.

In general, the dispenser comprises a casing with a removable tube containing the pills. An injector means in the casing is depressed each time a pill is to be removed. Upon fully depressing the ejector means, an indicating dial having calibrated markings is automatically advanced one increment. Thus, the user need not rely on his own memory to record the fact that he has taken a pill.

The dispenser is of a simplified design in order that it may be readily molded from an inexpensive plastic material. Inasmuch as the expense in producing this dispenser is relatively small, it may be used in place of a conventional bottle or package normally used in selling the pills through a pharmacy. It need not be discarded when the pill supply is exhausted since convenient means is provided for refilling it. The invention disclosed herein differs from other devices used to dispense pills in that a minimum of simplified parts are used, all of which may be easily molded by conventional molding techniques.

Thus, it is one object of this invention to provide a new and improved pill dispenser.

Another object of this invention is to provide a new and improved pill dispenser having an automatic means for recording the removal of each pill.

Another object of this invention is to provide a new and improved pill dispenser containing a tube or cartridge of pills which may be loaded into the dispenser by the user.

Other objects and advantages of this invention will be made apparent in the disclosure of the accompanying specification and the drawing in which:

FIG. 4 is a plan view of the case cover of the pill dispenser;

FIG. 5 is a plan view of the pill dispenser's ejector means shown in an extended position;

Figure 3:
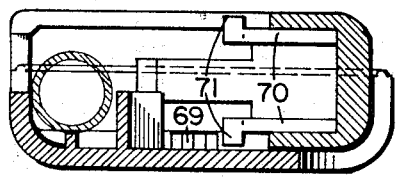
FIG. 3 is a sectional view taken along line 3—3 of FIG. 2.
Figure 2:
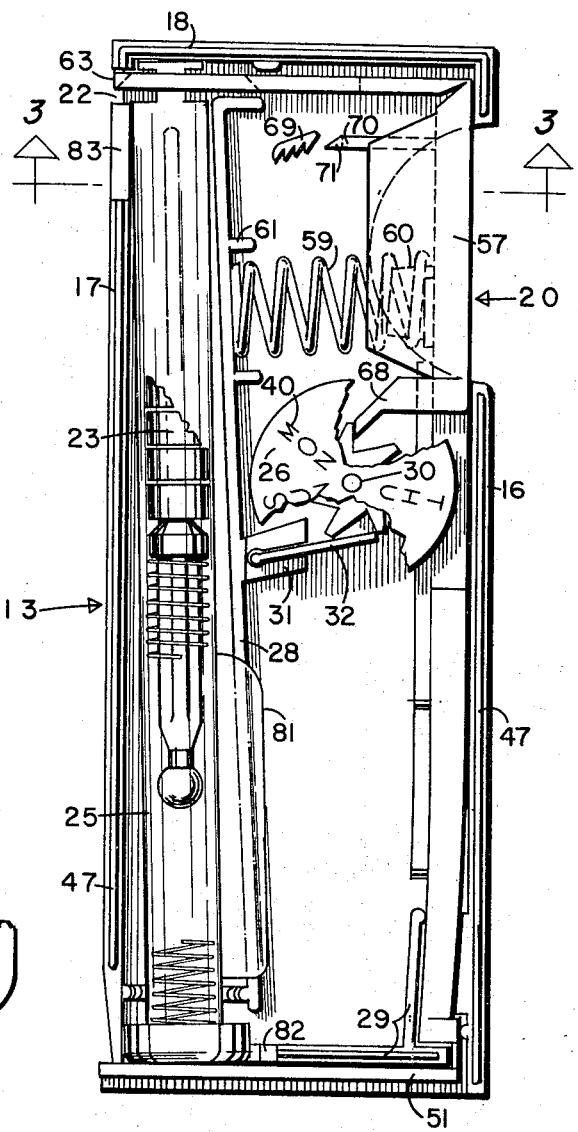
FIG. 2 is a plan view of the case base and assembled components of the pill dispenser.

The illustrated embodiment of this invention discloses a rectangular pill dispenser 11. However, it is to be understood that the principles of this invention can be embodied in other configurations. Referring to FIGS. 2 through 4, the dispenser case is formed from two sections, a base 13 and a cover 14. The base which is shown in FIGS. 2 and 3 is rectangular and has three walls 16, 17 and 18. The wall 16 defines an opening for engaging an ejector means 20 to be subsequently described. An opposite wall section 17 defines a small T-shaped pill exit 22 for ejection of pills 23.

The base 13 and cover 14 may both be formed from a substantially rigid plastic material. On the inner surface of the case base, various supporting elements are formed for maintaining a pill tube 25, the ejector means 20, an indicia-bearing dial 26 and several other components in their respective positions. Thus, a longitudinal tube guide 28 is provided in a spaced relationship from base wall 17. This guide is positioned to permit entry of the tube 25 containing pills through the bottom of the dispenser. Also extending from the base 13 is an L-shaped ejector guide 29 which serves to maintain the ejector in its proper position. A spindle hub 30 is provided to support the removable and rotatable dial 26. In the proximity of the hub 30 a slotted holder 31 is formed to support a removable and flexible anti-reverse pawl 32 that cooperates with the dial.

The cover 14 of the case is designed to cooperate with the base 13 to form an enclosure and in many respects is a mirror image of the base. Thus, the cover has a longitudinal tube guide 33 slightly spaced from the tube guide 28 on the base to hold the pill tube 25. Likewise, an L-shaped ejector guide 34 is provided on the cover for positioning the ejector means 20. The cover also defines openings 35 and 36 for actuating the ejector means and for exit of pills.

A small spindle 38 extends from the cover into hole 37 of dial 26 and serves to further positively seat the dial.

The base defines a reference means which in the particular illustration comprises an opening or window 39 for viewing one of the indicia 40 on the dial. This reference means 39 may also be in the form of a line or arrow which is positioned to register with one of the indicia on the dial. Although the dial is shown to be fully contained within the case, it may extend through the case and register with a reference point on the case. A thin groove 42 is formed in the edges of the three cover walls 43, 44 and 45 to receive a ridge 47 on the three base walls. An adhesive or other sealing means may be used to hold the ridge 47 and groove 42 in a tight junction.

Referring to FIG. 5, the dispenser's ejector means 20 is shown in an extended position illustrating the manner in which it may be molded. The ejector may also be formed from a plastic material but preferably should have some long-lasting resilient properties. A suitable material for forming the ejector is polypropylene. The ejector comprises three main sections 49, 50 and 51 with the two end sections 49 and 51 being dimensioned to fit within the top and bottom of the case. Each of these top and bottom sections 49 and 51 is connected integrally to the middle section by a thin flexible web 53 of plastic material which acts as a hinge. Thus, the two end sections may be formed at right angles with the middle section. The width of the bottom section 51 of the ejector is such that it approximates the space between the case cover and base, thereby completing the enclosure formed between the base and cover. The snug fit of the bottom section between the cover and base provides an effective latching means. A small projection 54 on this section enables it to be easily opened for gaining access into the joined base and cover.

The middle section 50 has a pair of spaced flanges 55 extending at its upper end which are visible through the opening defined in the case. It is the area between these flanges that serves as an actuating button 57 for the dispenser. Strengthening ribs 58 may be formed on the middle section if desired. The ejector has a substantial amount of resiliency built into it due to the properties of its plastic material and the abovementioned ribs. Consequently, the ejector has a tendency to stabilize in the position illustrated in FIG. 2.

Figure 9:
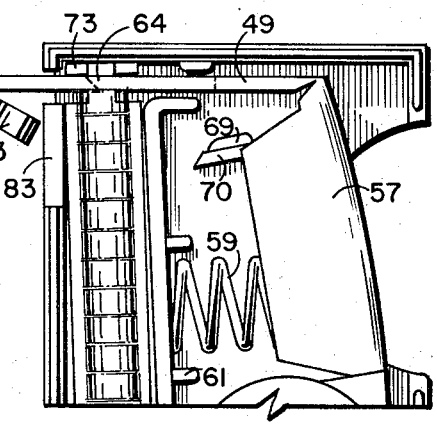
FIG. 9 is a partial plan view of the case base and assembled components of the pill dispenser with the ejector means depressed.

FIG. 9 illustrates the ejector in its depressed position. When pressure is released from the button 57, it will tend to return to the position shown in FIG. 2. However, in order to provide a faster and more positive means for return, a spring 59 may be used to further bias the ejector. Thus, a spring support 60 (FIG. 5) may be formed between the two flanges 55 of the middle section. The metal coil spring 59 is positioned over this support and mounted between two pairs of projections 61 on the case base and cover.

The upper section 49 of the ejector has a protective bar 63 which is designed to pass through the pill exit 22. The bar is normally positioned in the pill exit and prevents unwanted entry of foreign particles which might jam the mechanism or contaminate the pills. Extending parallel with this bar is an ejector tang 64 which engages the uppermost pill in the tube when the ejector is depressed.

Figure 6:
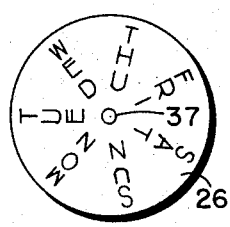
FIG. 6 is a plan top view of the indicating means for the pill dispenser of this invention illustrating the indicia.
Figure 7:
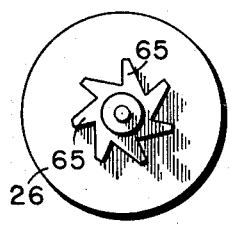
FIG. 7 is a plan bottom view of the indicating means.
Figure 8:
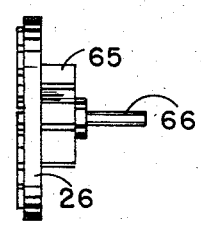
FIG. 8 is a side elevation view of the indicating means.

Referring to FIGS. 6–8, the indicia-bearing dial 26 has a number of ratchet teeth 65 molded at the base of spindle 66. These ratchet teeth cooperate with a drive pawl 68 extending from the ejector means' middle section 50. If one pill is to be taken each day, the dial may have seven ratchet teeth. The markings for the seven days of the week which appear on the face of the dial correspond with the seven teeth. If two pills are to be taken each day, fourteen teeth may be employed and the seven-day indicia may include a.m. and p.m. legends. Pressure pawl 32 stays in constant contact with the ratchet teeth of the dial and prevents movement of the dial in a reverse direction when the ejector means 20 returns to its stable position of FIG. 2.

The dispenser of this invention assures advancement of the dial one increment each time a pill is ejected. Depending upon the tolerances maintained in molding the various dispenser components and the resilient qualities of the dispenser material, it may be desirable to add additional means for assuring full depressment of the button 57 and the ejection of a pill prior to the button's return. One design for such a means comprises a pair of slightly inclined teeth-bearing racks 69 which are formed integrally with the case base and cover as shown in FIGS. 2–4. A pair of flexible anti-return pawls 70 are formed on the pair of flanges on the ejector's middle section. These anti-return pawls 70 have small projections 71 at their ends which track along the rack's teeth as the ejector is depressed.

Since the pair of racks 69 are slightly inclined, the cooperating pawls 70 tend to depress downward as their projections 71 advance along the racks. The ejector cannot return to its normal position until it has been depressed a sufficient distance to permit the two projections of the pawls to track beyond the ends of the racks. Once the two projections have passed beyond the racks, they will spring slightly upward and return over the smooth upper edges of the racks. In such a manner, the ejector will always be depressed a sufficient distance, and this, in turn, will assure proper advancement of the dial as well as ejection of a pill.

Figure 11:
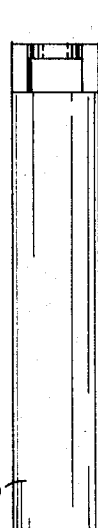
FIG. 11 is a plan view of the dispenser's pill tube without pills and disclosing the biasing means therein prior to its release.
Figure 10:
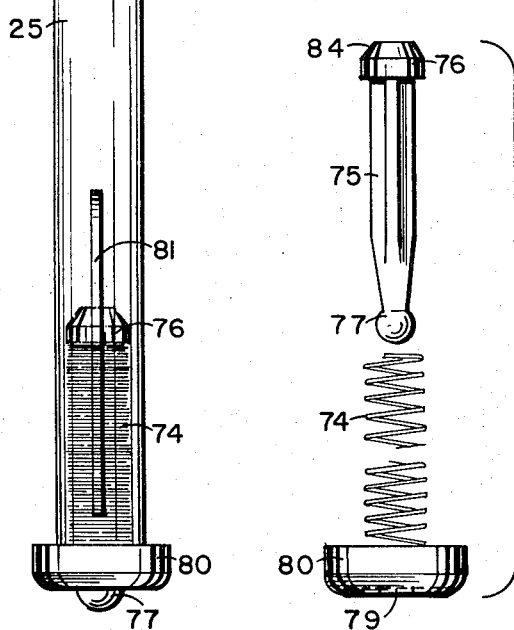
FIG. 10 is an exploded view of the biasing elements contained within the dispenser's pill tube.

Referring to FIGS. 10 and 11, the particular pill tube 25 illustrated is a hollow, transparent and cylindrical tube with a stirrup 73 at one end dimensioned to permit passage of one pill at a time. It is probable that the pill tube would in most instances be produced in one location and then shipped to another location for filling with pills. Thus, means must be provided for permitting the tube to be easily assembled at the second location after it is filled with pills without requiring any special tools. The pills are urged against the tube's stirrup 73 by a biasing means which in the illustrated embodiment comprises a compression spring 74 mounted on a follower 75. The follower has a large knob 76 on one end which is in contact with the bottom-most pill. The other end of the follower has a smaller knob 77 dimensioned to permit forcible passage through an opening 79 in the pill tube cap 80.

As shown in FIG. 11, the follower, when connected to the cap, extends through the opening 79 in the pill tube cap 80 and is held there by the small knob 77. In assembling the tube, pills are first inserted in a stacked relationship and then the assembled follower with spring 74 and tube cap 79 is mounted. The cap is firmly maintained over the open end of the tube by a snap fitting. In what can be a simultaneous action with the placement of the cap, the follower is pushed away from the cap toward the pills by applying force to knob 77. When sufficient pressure is applied, the small knob of the follower is forced through the cap's opening permitting the spring to lengthen itself and urge the follower's large knob 76 against the stack of pills. The tube, with its pills stacked and biased against stirrup 73, is now ready to be used.

In most instances the dispenser will be sold to the user with the pill tube containing the pills wrapped in a separate package for maintaining the pills in an air-tight condition. When the user is ready to take the pills he presses the ejector button 57 on the empty dispenser a sufficient number of times to advance the indicator dial 26 to the proper day or hour. He then removes the spring-loaded tube 25 from its package and inserts it into the opening at the bottom of the case. A key flange 81 on one side of the tube assures proper placement of the tube in the case whereby the ejector tang 64 may pass through the tube's stirrup 73. The tube may only be inserted with the key flange 81 registering with a keyway formed by two half slots 82 in the bottom on the case's cover and base. When the tube is fully inserted into the dispenser it is maintained in proper position since the key flange is captured between the two spaced tube guides 28 and 33. After the tube is inserted, the bottom section of the ejector is snapped shut and the dispenser is ready for use.

Figure 1:
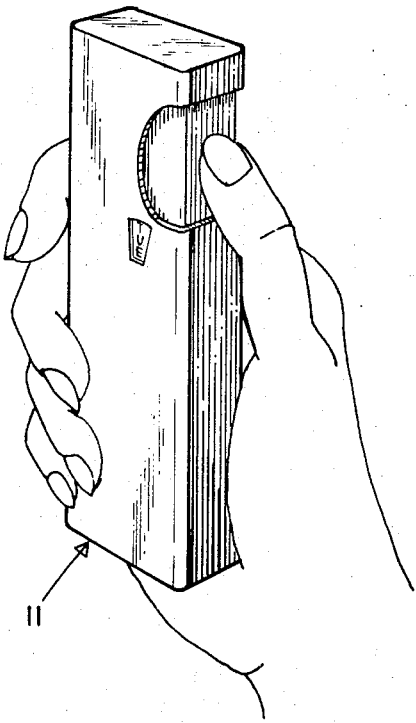
FIG. 1 is a perspective view of the pill dispenser of this invention.

As shown in FIG. 1, the dispenser is operated by pressing the button 57 of the ejector's middle section. This, in turn, causes forward movement of the ejector's top section 49 and the tang 64 passes through the tube's stirrup 73 to eject a pill 23. Simultaneously with this ejection, the drive pawl 68 advances the dial one increment. (See FIG. 9.) As soon as a pill is ejected, the next pill advances to a position adjacent the pill exit. It is possible that the user will occasionally forget if he has taken a pill. In such an event he merely reads the day of the week appearing in the cover opening 39. If the current day is registered he will know that he has not yet taken a pill.

The vertical portion 83 of the T-shaped opening of the pill exit 22 formed between the base and cover permits the user to view three or four of the pills in the adjacent transparent tube. This serves to give him advance notice as to when the supply of pills in the tube is about to be exhausted. When the last pill is removed, the large ball 76 of the follower becomes aligned with the exit. An inclined surface 84 is provided on this ball to enable the tang to slide over it if the user should press the button. Consequently, the ball 76 does not block movement of the tang and damage thereto is avoided.

It is to be noted that the pills in the tube may comprise two or more medicaments. This enables sequential treatment in that a first medicament may be consumed followed by a second medicament since the pills, once placed in the tube in a predetermined pattern, cannot be varied.

Thus, the pill dispenser of this invention provides automatic recording of each pill removed from the dispenser. In addition, the dispenser enables the user to reload it by simply unlatching the bottom section 51 of the ejector and inserting a new tube filled with pills.

It is to be noted that this dispenser is formed from relatively few parts which are inexpensive to manufacture. With the exception of the compression spring 59, which may or may not be necessary, depending on the resiliency of the material in the ejector, all of the dispenser's components are easily molded from a plastic material. Likewise, the tube assembly containing the pills is formed of plastic with the exception of the biasing spring 74 on the follower. Thus, the novel design of this invention leads to mass production by standard plastic injection molding techniques.

Although only one embodiment of this invention has been illustrated and described, it will be apparent to those skilled in the art that other embodiments may be formed without departing from the spirit of this invention and the scope of the appended claims.

I claim:
1. A pill dispenser and indicating means comprising:
   a casing,
   means in said casing adapted for holding a stack of pills in a biased condition,
   said stack of pills being maintained in a tube removably positioned in said casing, said tube having a longitudinal key portion along its outer surface,
   said casing having a bottom defining an opening with a keyway adapted for receiving said tube and key portion,
   an indicia-bearing dial rotatably mounted on said casing,
   a reference means on said casing associated with said indicia-bearing dial,
   an exit passage defined by said casing adjacent the topmost of said stack of pills,
   a pill ejector contained in said casing, said pill ejector having a first section with a segment in ejecting contact with the topmost of said stacked pills when depressed,
   said pill ejector having a second section hinged to said first section with a portion thereof exposed to the exterior, said first and second sections being resiliently positioned in said casing,
   said pill ejector having a third section hinged to said second section and extending over the opening in said casing bottom,
   said pill ejector having an element extending from said second section in engageable contact with said indicia-bearing dial causing advancement thereof each time said second section is depressed for pill ejection.

2. A pill dispenser according to claim 1 in which said pill tube has a stirrup maintaining the topmost pill in an ejecting position.

3. A pill dispenser according to claim 2 in which said pill ejector first section has a tang positioned for passage through said tube stirrup upon depressment of said ejector.

4. A pill dispenser according to claim 3 in which the pills in said tube are urged toward said stirrup by a follower and a compressed spring on said follower, said follower having a pill seat at one end with the other end being adapted for selective engagement with a cap on said pill tube causing said spring to be further compressed.

5. A pill dispenser according to claim 3 in which said ejector's element comprises a driving pawl in engageable contact with a ratchet ring on said dial.

6. A pill dispenser according to claim 5 in which a resilient check pawl is mounted within said casing and against said dial ratchet ring.

7. A pill dispenser according to claim 6 in which said three ejector sections comprise a single integral plastic molding.

References Cited

UNITED STATES PATENTS

| 639,114 | 12/1899 | Tochtermann. |
| 3,270,915 | 9/1966 | Auer _____ 221—2 |

FOREIGN PATENTS

| 10,122 | 1909 | Great Britain. |
| 136,850 | 1880 | France. |

SAMUEL F. COLEMAN, *Primary Examiner.*